United States Patent
Grossman (10) Patent No.: US 7,420,988 B1
(45) Date of Patent: Sep. 2, 2008

(54) NETWORK RELAY PROTOCOL HAVING TIMED PACKET AGGREGATION

(75) Inventor: Stu Grossman, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 970 days.

(21) Appl. No.: 10/369,054

(22) Filed: Feb. 14, 2003

Related U.S. Application Data (60) Provisional application No. 60/403,606, filed on Aug. 14, 2002.

(51) Int. Cl.
*H04L 12/66* (2006.01)

(52) U.S. Cl. .................... 370/466; 370/474; 370/356

(58) Field of Classification Search ............... 370/401, 370/473, 474, 476, 465, 466, 467, 428, 356
See application file for complete search history.

(56) References Cited

U.S. PATENT DOCUMENTS

| | | | | |
|---|---|---|---|---|
| 6,522,667 B1* | 2/2003 | Oda et al. | ............ | 370/474 |
| 6,618,397 B1* | 9/2003 | Huang | ............ | 370/474 |
| 6,680,943 B1 | 1/2004 | Gibson et al. | | |
| 6,728,261 B1* | 4/2004 | Sasson et al. | ............ | 370/466 |
| 6,731,649 B1* | 5/2004 | Silverman | ............ | 370/466 |
| 6,751,218 B1* | 6/2004 | Hagirahim et al. | ............ | 370/390 |
| 6,757,298 B1* | 6/2004 | Burns et al. | ............ | 370/473 |
| 6,778,494 B1 | 8/2004 | Mauger | | |
| 6,778,531 B1 | 8/2004 | Kodialam et al. | | |
| 6,798,785 B1* | 9/2004 | Sasson et al. | ............ | 370/466 |
| 6,842,454 B2* | 1/2005 | Metcalf, III | ............ | 370/392 |
| 6,882,643 B1 | 4/2005 | Mauger et al. | | |
| 6,885,677 B1 | 4/2005 | Klevans | | |
| 6,931,025 B1* | 8/2005 | Masuda | ............ | 370/466 |
| 6,937,598 B1* | 8/2005 | Hagirahim et al. | ............ | 370/356 |
| 6,963,561 B1* | 11/2005 | Lahat | ............ | 370/356 |
| 6,993,021 B1* | 1/2006 | Chuah et al. | ............ | 370/389 |
| 7,002,993 B1* | 2/2006 | Mohaban et al. | ............ | 370/471 |
| 7,013,318 B2* | 3/2006 | Rosengard et al. | ............ | 715/504 |
| 7,027,450 B2* | 4/2006 | Collette et al. | ............ | 370/401 |
| 7,031,312 B1 | 4/2006 | Jayakumar et al. | | |
| 7,197,033 B2 | 3/2007 | Reeves et al. | | |
| 7,333,509 B1* | 2/2008 | Gadagottu | ............ | 370/467 |
| 2003/0118047 A1* | 6/2003 | Collette et al. | ............ | 370/464 |
| 2003/0204617 A1* | 10/2003 | Buchsbaum et al. | ............ | 709/236 |
| 2004/0008718 A1* | 1/2004 | English et al. | ............ | 370/442 |
| 2006/0034328 A1* | 2/2006 | Aldermeshian et al. | ..... | 370/466 |

OTHER PUBLICATIONS

"A Comparative Overview of Frame Relay and ATM" Sprint Technical Report, Jun. 2001.
"Understanding the Big ATM Picture" Kristin King, Oct. 19, 2001.
"Real-World ATM" Kristin King, Oct. 19, 2001.
U.S. Appl. No. 10/108,324, entitled "Cell Relay Using the Internet Protocol," filed Mar. 26, 2002, Ramana Gadagottu.

* cited by examiner

*Primary Examiner*—Min Jung
(74) *Attorney, Agent, or Firm*—Shumaker & Sieffert, P.A (57) ABSTRACT

Frames are relayed through a packet network by pre-pending a packet header to the frames. The packet may be formed in response to a timing mechanism indicating that the frames have been buffered for more than a threshold time interval. Alternatively, the packet may be formed in response to buffering a threshold number of frames. The packet is relayed through the packet network to an egress device. The egress device removes the header from the packet, and forwards the frames via one or more virtual circuits.

37 Claims, 8 Drawing Sheets

NETWORK RELAY PROTOCOL HAVING TIMED PACKET AGGREGATION

This application claims priority from U.S. provisional application Ser. No. 60/403,606 filed Aug. 14, 2002, the entire content of which is incorporated herein by reference.

TECHNICAL FIELD

The invention relates to computer networks and, more particularly, to routing packets within computer networks.

BACKGROUND

Customer networks are networks established by individuals or companies for internal communication. Customer networks may include local area network (LAN), wide area networks (WAN), and the like. The customer networks may meet customer-specific needs using a number of different communication protocols, such as Asynchronous Transfer Mode (ATM) protocol, frame relay protocols and the like. ATM and frame relay protocols, for example, are frequently used for transport of audio, video, and computer data between a source and destination device within a customer network. Such protocols may transfer information in units, such as frames.

To transfer the frames, switches within a customer network create a fixed path, referred to as a virtual circuit. The frames transmitted by a source device within the customer network travel along the virtual circuit created by the switches. A destination device receives the frames from the virtual circuit, and reassembles the information from the frames. The fixed paths allow customer network equipment to readily allocate and manage the bandwidth required to transmit video, audio, and computer data over the same customer network.

Another popular network technology is the Internet Protocol (IP) networking protocol in which information is divided into blocks called packets. In contrast to frame-based protocols, such as ATM and frame relay, IP-based networks individually route these packets, also referred to as datagrams, across the network from a source device to a destination device. In other words, unlike the virtual circuits within a customer network, each packet can take a different route from the source to the destination device within the IP network. The destination device extracts the information from the packets, and assembles the information into its original form.

In order to allow remote customer networks to communicate, IP-based communication techniques are being developed that relay frames through an IP network, such as the Internet. According to the techniques, ingress routers to the IP network can receive frames from one of the customer networks, encapsulate the frames within packets, and route the packets through the IP network to the other customer network.

SUMMARY

In general, the invention provides techniques to relay data between frame-based networks, such as customer networks using ATM or frame relay, through an Internet Protocol (IP) network, such as the Internet. More specifically, an ingress router of the IP network receives inbound frames from an ATM network via one or more virtual circuits. The ingress router may aggregate the inbound frames from each virtual circuit in a respective data structure, which may be implemented as a set of queues. The ingress router may aggregate multiple frames from one or more virtual circuits in a queue, and form a packet when the number of frames in the queue reaches a threshold number of frames.

For instance, the ingress router may be configured to form packets of a threshold number of frames, e.g., eight frames. Upon receiving the eighth frame, the ingress router forms a packet by pre-pending a header to the aggregated frames. Alternatively, the ingress router may form a packet when the queue reaches a threshold length. For example, the ingress router may form a packet when the queue aggregates a threshold number of bytes. The ingress router may further map each virtual circuit, and in turn each queue, to an associated IP header. In this manner, the ingress router forms a packet that encapsulates the frames of a particular queue by pre-pending a similar associated header to each set of frames. By creating packets that encapsulate multiple frames, and routing those packets the efficiency of the networks may increase.

To prevent frames from remaining in the queue for extended periods of time, the ingress router may form a packet that encapsulates the frames of the queue when a timing mechanism indicates that the frames have been buffered for more than a threshold time interval. For example, upon receiving the first frame of a queue, the ingress router may set a timestamp associated with the queue. The ingress router monitors the timestamps of the queues, and forms a packet when the difference between the current time and the timestamp of a specific queue exceeds a threshold time interval. In this manner, the ingress router may form a packet that contains less than the threshold number of frames.

The ingress router forwards the packets to the IP network via an IP interface card without regard to the content of the frames. In this manner, routers with the IP network may relay frames of any type, including data and control frames. In particular, the routers need not disassemble or reassemble the frame information carried by the packets.

In one embodiment, a method comprises buffering a set of frames. The method further includes forming a packet to encapsulate the set of frames upon buffering at least one frame for greater than a threshold time interval. The method also includes routing the packet through a network. The method may also include associating a set of data structures with the virtual circuits to aggregate the frames. Data structures may correspond to one or more virtual circuits.

In another embodiment, a method comprises buffering a set of frames. The method further includes forming a packet to encapsulate the set of frames. The method also includes routing the packet through a network. Forming a packet may include forming a packet upon buffering at least one of the frames for greater than a threshold time interval. Alternatively, forming a packet may include forming a packet upon buffering a threshold number of frames.

In another embodiment, a method comprises receiving a packet from a network. The method further comprises removing a header of the packet to extract one or more frames. The method also includes forwarding the cells to an ATM switch via one or more virtual circuits.

In another embodiment, a computer-readable medium comprises instructions that cause a processor to buffer a set of frames. The computer-readable medium also includes instructions to form a packet to encapsulate the frames upon buffering at least one frame for greater than a threshold time interval. The computer-readable medium further comprises instructions that cause the processor to route the packet through a network.

In another embodiment, an apparatus comprises an interface card to receive frames, and to buffer the inbound cells. The apparatus further comprises a control unit to form a packet to encapsulate the buffered frames upon buffering at least one frame for greater than a threshold time, and to relay the packets through a network in accordance with the headers.

The invention may provide one or more advantages. For example, a number of ATM networks may be readily interconnected using an IP network, such as the Internet. Routers within the IP network can relay frames as IP packets without regard to the content of the frames. In this manner, the routers may relay frames of any time, including data and control frames. Furthermore, routers need not disassemble or reassemble the information carried by the cells.

Aggregating multiple frames into a packet may further increase network efficiencies. For example, instead of relaying each frame as an individual packet, the ingress router for the IP network can aggregate multiple frames to form a single packet, thereby allowing for a reduction of bandwidth usage. Also, the techniques may prevent or reduce the amount of time received frames sit idle at the ingress router. Furthermore, the aggregation of multiple frames within a single packet may reduce the amount of resources spent on re-ordering frames by the egress router. Specifically, multiple frames can be aggregated within a single packet in the order received from the frame-based network, and need not be reordered be the egress router of the IP network. Accordingly, even though packets may traverse different routes within an IP network, and therefore may be received out of order by the destination device, the resources required to reorder the individual frames can be reduced.

DETAILED DESCRIPTION

Figure 1:
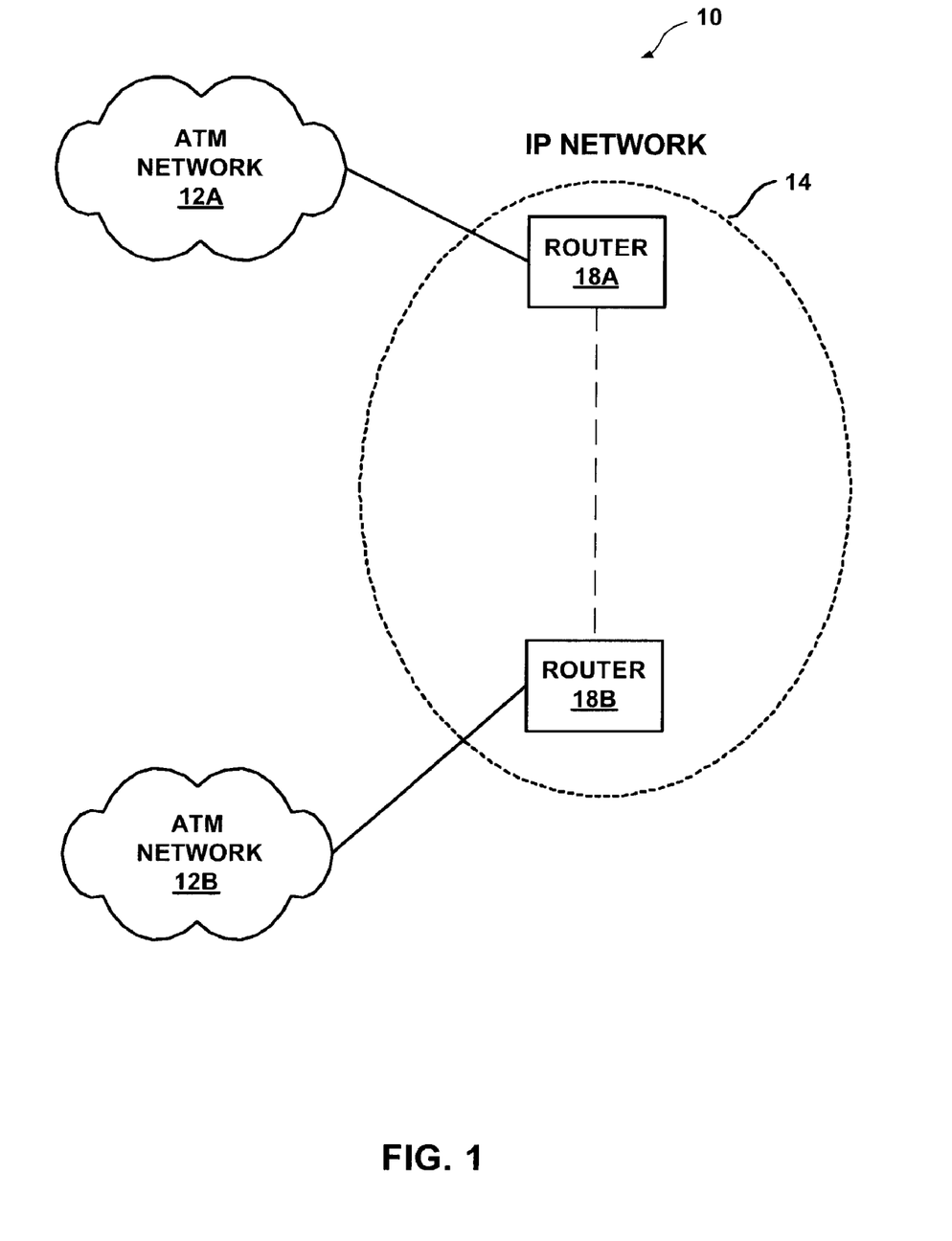
FIG. 1 is a block diagram illustrating an example system in which a number of ATM networks are communicatively coupled via an Internet Protocol (IP) network in accordance with the principles of the invention.

FIG. 1 is a block diagram illustrating an example system 10 in which ATM networks 12A-12B (collectively, ATM networks 12) are communicatively coupled via an Internet Protocol (IP) network 14 in accordance with the principles of the invention. ATM networks 12 may be customer-specific networks that use non-IP protocols, such as asynchronous transfer mode (ATM), frame relay and the like. For example, a large business organization may have a number of remote locations. Each company location may have a network, such as a frame relay network, to support communications at the remote location. In order to communicate with other company locations, the organization may elect to relay information through IP network 14, which represents any packet-based network, such as the Internet.

ATM networks 12 represent customer-specific networks that communicate information in fixed or variable-sized units, referred to as frames. ATM networks 12 may communicate the frames via a number of virtual circuits coupled to routers 18A-18B (collectively, routers 18) of IP network 14. In general, routers 18 receive frames from ATM networks 12, and route the frames in the form of packets through IP network 14. In this manner, devices within ATM networks 12 may transparently communicate frames across IP network 14.

More specifically, routers 18 may route frames through IP network 14 by pre-pending headers on sets of frames to form packets, such as IP packets, Multiprotocol Label Switching (MPLS) packets, or the like. For example, routers 18 may construct Label Switch Paths (LSPs) within IP network 14 in accordance with the MPLS protocol. Upon receiving frames from ATM network 12A, for example, router 18A constructs an MPLS packet that includes one or more frames. Router 18A routes the packet through IP network 14 to router 18B via a corresponding LSP. Router 18B disassembles the MPLS packet into individual frames, and forwards the frames to ATM network 12B. In another example, routers 18 may construct an IP packet, in which case a specific LSP through IP network 14 is not constructed.

As described in detail below, routers 18 receive inbound frames from ATM networks 12 via the virtual circuits. Using router 18A for purposes of explanation, routers 18A may aggregate the inbound frames from each virtual circuit in a respective data structure, which may be implemented as a queue. Router 18A may aggregate multiple frames in the queue, and form a packet when the number of frames in the queue reaches a threshold number of frames. For instance, router 18A may be configured to form packets of a threshold number of frames, e.g., eight frames. Upon receiving the eighth frame, router 18A forms a packet by pre-pending a header to the aggregated frames. Alternatively, router 18A may form a packet when the queue reaches a threshold length. For example, router 18A may form a packet when the queue aggregates a threshold number of bytes. Router 18A may further map each virtual circuit, and in turn each queue, to an associated header. In this manner, router 18A forms a packet that encapsulates the frames of a particular queue by pre-pending a similar associated header to each set of frames. By creating packets that encapsulate multiple frames, the techniques may increase the bandwidth utilization of IP network 14.

However, to prevent frames from remaining in the queue for long periods of time, router 18A may form a packet to encapsulate the frames of the queue when a timing mechanism indicates that the frames have been buffered for more than a threshold interval. For example, upon receiving the first frame of a queue, router 18A may set a timestamp associated with the queue. Router 18A monitors the timestamps of the queues, and forms a packet when the difference between the current time and the timestamp of a specific queue exceeds the threshold time interval. In this manner, router 18A may form a packet that contains less than the threshold number of frames.

Router 18A forwards the packets to IP network 14 via an IP interface card. Other routers (not shown) within IP network 14 forward the packets without regard to the content of the frames. In this manner, the routers may relay frames of any time, including data and control frames, and need not disassemble or reassemble the information carried by the frames.

Figure 2:
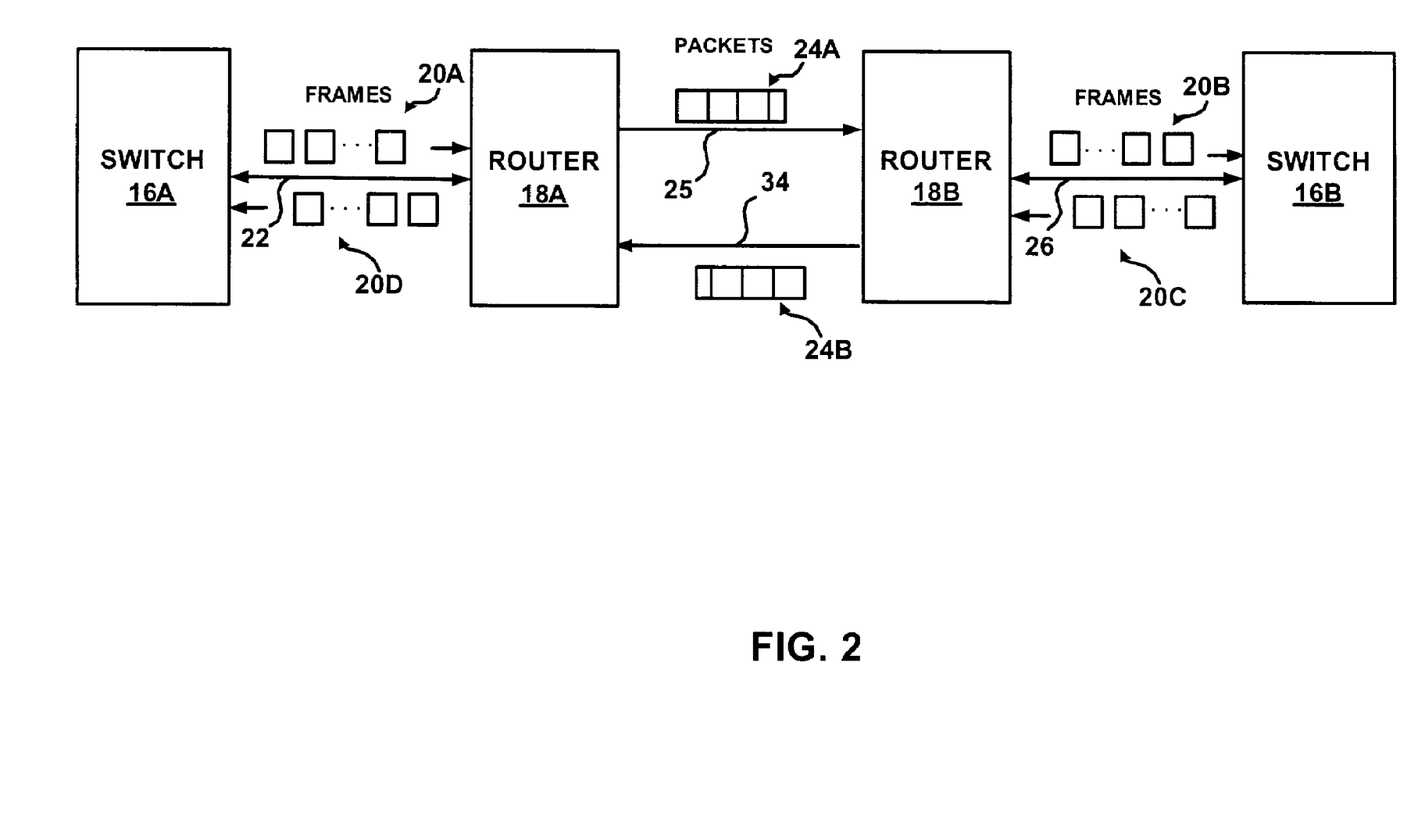
FIG. 2 is a block diagram illustrating a process of aggregating frames to form packets and routing the packets through the IP network.

FIG. 2 is a block diagram illustrating a process of aggregating frames to form packets and routing the packets through IP network 14. In the example of FIG. 2, ATM network 12A outputs frames 20A on a virtual circuit 22. Router 18A receives inbound frames 20A, and aggregates frames 20A in a data structure, which may be implemented as a queue. Upon aggregating a threshold number of frames in the queue, or upon buffering the frames for more than a threshold interval, router 18A forms a packet 24A that encapsulates frames 20A by pre-pending an associated header to frames 20A aggregated in the respective queue.

In this manner, router 18A may form a single IP packet to encapsulate multiple frames. For example, router 18A may form packet 23A by pre-pending an associated IP header on frames 20A of the respective queue without regard for the contents of frames 20A. Furthermore, each time router 18A forms a packet for that particular queue by pre-pending a similar header to the packet. In this manner, router 18A maps each queue and, more particularly, each virtual circuit to an associated header. Router 18A routes packet 24A through IP network 14 to router 18B via path 25. Path 25 may be a defined path, such as when router 18A forwards an MPLS packet via an LSP. Alternatively, path 25 may not be defined, such as when router 18A forwards an IP packet through network 14.

Upon receiving packet 24A, router 18B removes the header of packet 24A, and separates packet 24A into individual frames 20B that are equivalent to the original frames 20A. Router 18B forwards frames 20B to ATM network 12B via virtual circuit 26.

Communications in the other direction flow in a similar manner. Namely, ATM network 12B outputs frames 20C on virtual circuit 26. Router 18B receives inbound frames 20C from virtual circuit 26, and aggregates frames 20C in a queue. Upon aggregating a threshold number of frames in the queue or buffering the frames for more than a threshold interval, router 18B form a packet 24B that encapsulates frames 20C by pre-pending an associated header to aggregated frames 20C in the respective queue. Router 18B routes packet 24B through IP network 14 to router 18A via path 34. Router 18B removes the header of packet 24B, separates packet 24B into frames 20D, and forwards frames 20D to ATM network 12A via virtual circuit 22.

Figure 3:
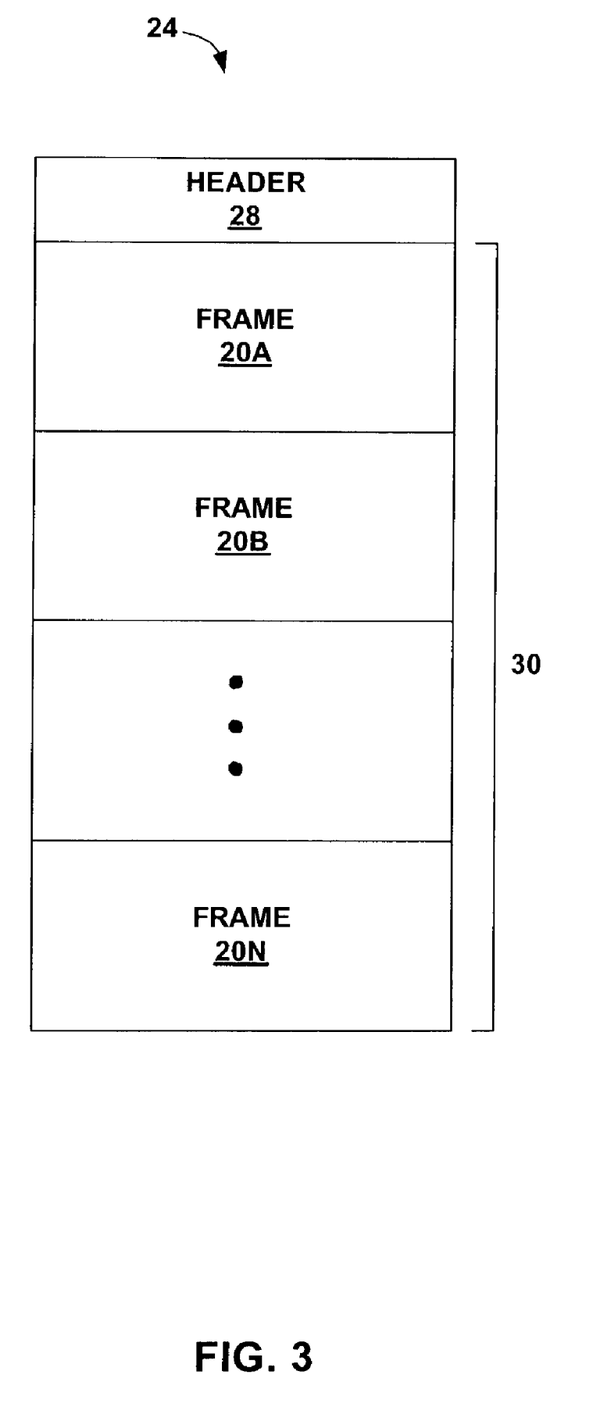
FIG. 3 is a block diagram illustrating an exemplary data structure of a packet formed by a router to encapsulate frames.

FIG. 3 is a block diagram illustrating an example data structure of a packet 24 formed by routers 18 to encapsulate frames 20A-20N (collectively, frames 20). In particular, packet 24 includes a header 28, and a payload 30 comprising one or more frames 20.

Header 28 may contain packet-related information, such as source address of an ingress router, destination address of an egress router, protocol, size of packet 24, and the like. Payload 30 contains one or more frames 20 that may be buffered in a respective queue. In the example of FIG. 3, payload 30 includes multiple frames 20 buffered consecutively. Alternatively, payload 30 may separate one or more frames 20 with a pad of bytes. For example, a pad of four bytes may be placed between one or more of frames 20.

In this manner, payload 30 of packet 24 may contain frames 20 received from ATM network 12A either in order or out of order. Frames 20 may be from one or more sources or virtual circuits. Instead of frames 20, payload 30 may contain one or more individual cells of a fixed length. For example, ATM networks may communicate using cells of a fixed length. Routers 18 aggregate the inbound cells in the queue in the same manner that routers 18 aggregate inbound frames 20.

Routers 18 may form packet 24 when a queue that aggregates frames 20 contains a threshold number of frames 20. Alternatively, routers 18 may form packet 24 when a timing mechanism indicates that the frames have been buffered for more than a threshold time interval.

Figure 4:
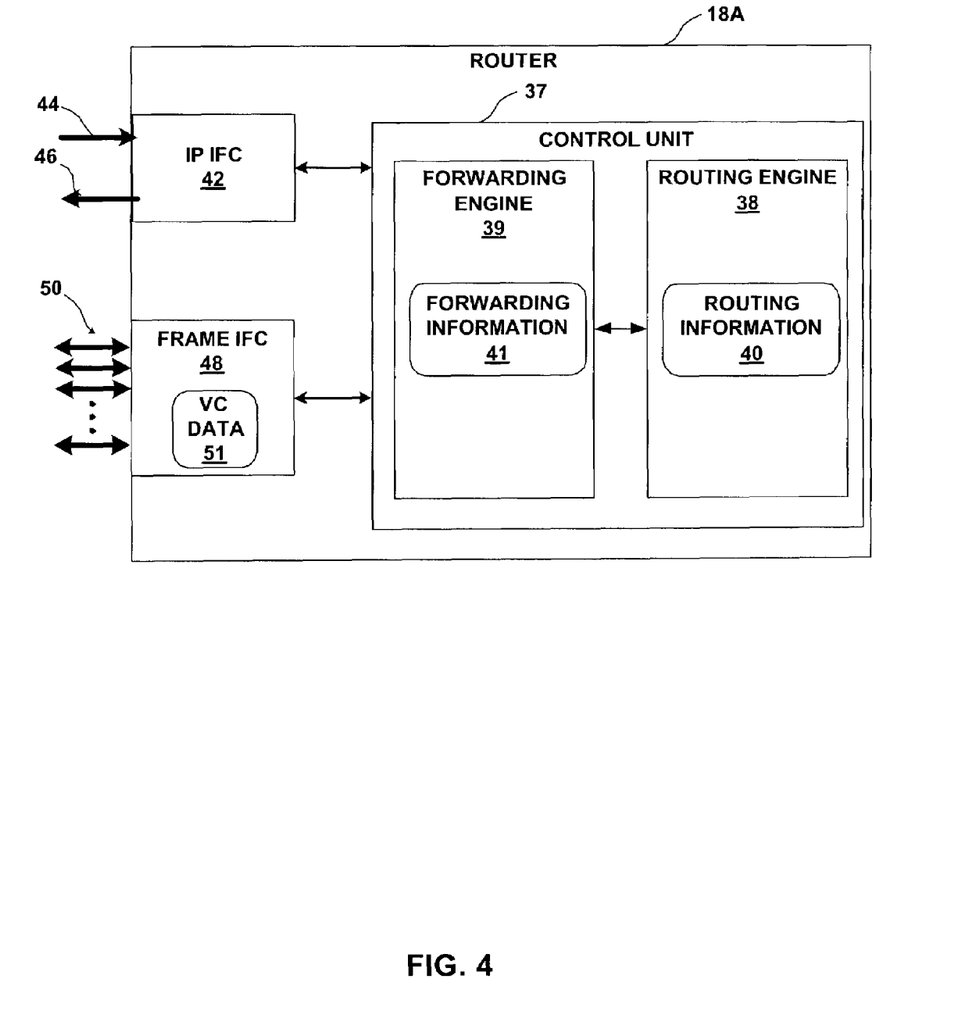
FIG. 4 is a block diagram illustrating an example router that aggregates frames to form packets and routes the packets through an IP network in accordance with the principles of the invention.

FIG. 4 is a block diagram illustrating an exemplary router 18A that aggregates frames to form packets and routes packets, such as packet 24 (FIG. 2), through IP network 14 in accordance with the principles of the invention. Router 18A includes a control unit 37 that may comprise a routing engine 38 and a forwarding engine 39. Routing engine 38 and forwarding engine 39 may comprise one or more dedicated processors, software, hardware, or combinations thereof.

Routing engine 38 maintains routing information 40. Routing information 40 may describe the topology of IP network 14 and, in particular, routes through IP network 14. Routing information 40 may include, for example, route data that describes various routes within IP network 14, and corresponding next hop data indicating appropriate neighboring devices within IP network 14 for each of the routes. In this manner, routing information 40 may map LSPs within the IP network to particular interface ports. Routing information 40 is periodically updated to accurately reflect the topology of IP network 14.

Routing engine 38 analyzes stored routing information 40 and generates forwarding information 41 for forwarding engine 39. Forwarding information 41 may associate, for example, network destinations with specific next hops and corresponding interface ports. Forwarding information 41 may, therefore, be thought of as derived from the information contained within routing information 40 maintained by routing engine 38.

Router 18A further includes at least one IP interface card (IP IFC) 42 for communicating packets between router 18A and IP network 14 via network links 44 and 46. IP IFC 42 is typically coupled to network links 44, 46 via one or more interface ports. Furthermore, router 18A includes at least one frame IFC 48, configured to communicate frames via virtual circuits 50. For example, frame IFC 48 may be an ATM interface card for communicating frames (or cells) via virtual circuits 50.

Control unit 37 further generates virtual circuit (VC) data 51 that, in conjunction with routing information 40, maps virtual circuits 50 to corresponding headers. Control unit 37 may, for example, generate VC data 51 to map virtual circuits 50 to a set of unique identifiers that correspond to entries within routing information 40. In this manner, VC data 51 and routing information 40 map virtual circuits 50 to corresponding headers. Control unit 37 may generate the mapping in response to input received from a system administrator or user, or a routing protocol, such as BFP or RDP and communicates VC data 51 to frame IFC 48 for application to inbound frames received from virtual circuits 50.

In general, router 18A relays frames through IP network 14 by forming a packet that encapsulates one or more frames, and forwarding the packet through IP network 14. More particularly, frame IFC 48 receives inbound frames from customer network 12A via virtual circuits 50, and may aggregate the inbound frames in an associated data structure, which may be implemented as a queue. Each of virtual circuits 50 may correspond to a queue. Alternatively, more than one of virtual circuits 50 may correspond to each queue. In this manner, frame IFC 48 may include a set of queues that buffer inbound frames for respective virtual circuits 50.

Router 18A may aggregate the inbound frames consecutively in the queue. In this manner, router 18A may aggregate the inbound frames in the order in which the frames are received. Upon receiving the first frame of a queue, frame IFC 48 may initiate a timing mechanism to determine whether the queue buffers the frames for greater than a threshold interval. Frame IFC 48 may be configured to form a packet upon receiving a threshold number of frames. Alternatively, in the event that an insufficient number of frames are received, frame IFC 48 may form a packet upon the timing mechanism indicating that the frames have been buffered for more than a threshold interval, such as 125 microseconds. Upon one of the above events occurring, frame IFC 48 selectively retrieves a unique identifier from VC data 51 for the frames of the respective queue based on virtual circuits 50 from which the frames arrived. Frame IFC 48 communicates the frames of the queue and the respective unique identifier to control unit 37.

Control unit 37 assigns each inbound set of frames an appropriate header from routing information 40 based on the respective unique identifier, and forms outbound packets by pre-pending the header to the respective set of frames. In accordance with routing information 40, control unit 37 forwards the packets on IP network 14 via network link 46. In the reverse direction, IP IFC 42 receives a packet from IP network 14 via network link 44. IP IFC 42 communicates the packet to control unit 37. Control unit 37 removes the header from the packet, and communicates the frames to frame IFC 48. Frame IFC 48 outputs the frames to switch 16 via virtual circuits 50.

Router 18A may operate according to executable instructions fetched from a computer-readable medium (not shown). Examples of such media include random access memory (RAM), read-only memory (ROM), non-volatile random access memory (NVRAM), electrically erasable programmable read-only memory (EEPROM), flash memory, and the like. The functions of router 18A may be implemented by executing the instructions of the computer-readable medium with one or more processors, discrete hardware circuitry, firmware, software executing on a programmable processor, or a combination of any of the above.

Figure 5:
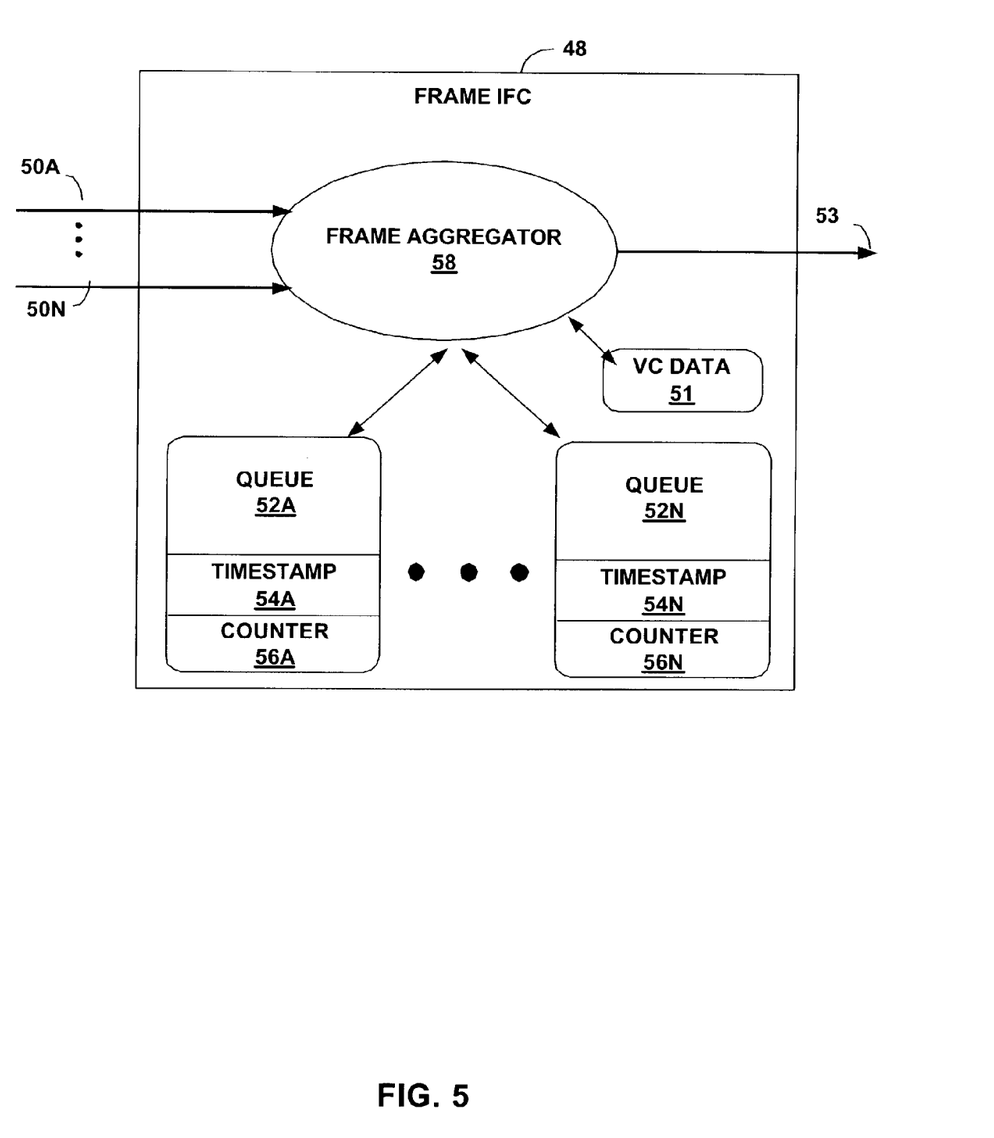
FIG. 5 is a block diagram illustrating an exemplary interface card (IFC) that receives frames from an ATM networks.

FIG. 5 is a block diagram illustrating an exemplary IFC that receives frames from customer networks 12. In the example illustrated in FIG. 5, frame IFC 48 includes a frame aggregator 58 to receive frames from virtual circuits 50A-50N (collectively, virtual circuits 50). Upon receiving frames from virtual circuits 50, frame aggregator 58 selects one of queues 52A-52N (collectively, queues 52) based on virtual circuits 50 that receive the frames. Frame aggregator 58 adds received frames to the one of queues 52 that corresponds to virtual circuit 50 receiving the frames. In this matter, queues 52 aggregate inbound frames from virtual circuits 50. Each of queues 52 may correspond to a single virtual circuit 50, as shown in the example of FIG. 5. Alternatively, some of queues 52 may aggregate inbound frames from multiple virtual circuits 50. However, when aggregating frames from multiple virtual circuits 50, the inbound frames must have the same destination router. For example, frame IFC 48 may store the frames inbound on a first and second virtual circuit in the same queue 52. In this manner, ingress router 18A may form packets that encapsulate frames from one or more virtual circuits, and route the packets through IP network 14 to the one or more egress routers.

Frame aggregator 58 may further associate a timing mechanism, such as timestamps 54 in the example of FIG. 5, with each of queue 52. Timestamps 54 may record the reception of the first frame to the associated queue 52. Alternatively, timestamps 54 may record the most recent reception of a frame to the associated queue 52. Furthermore, frame aggregator may associate counters 56 with respective queues 52 to track the size of queues 52, such as the number of frames in queues 52. For example, upon adding the first inbound frame to an empty queue 52, frame aggregator 58 increments counter 56 and initiates a timing mechanism to track the length of time the received frame is buffered.

Frame aggregator 58 may set one of timestamps 54 associated with a receiving one of queues 52 and may further monitor timestamps 54 associated with queues 52 to determine whether any of queues 52 buffer the frames for greater than a threshold time interval. For example, frame aggregator 58 may read a current time from a real-time clock, and compare the current time with each of timestamps 54 to determine whether any of queues 52 hold frames that have been buffered for greater than a threshold time interval. Alternatively, frame aggregator 58 may initialize a timer, such as a software timer provided by a real-time operating system, a hardware timer provided by a real-time clock, and the like.

When the timing mechanism indicates that one of queues 52 has buffered at least one frame for more than a threshold interval, frame IFC 48 may read the frames from the particular one of queues 52, and selectively retrieve a unique identifier from VC data 51 for the frames based on the virtual circuits 50 corresponding to the queue. Frame IFC 48 communicates the frames and the respective unique identifiers to control unit 37.

Frame aggregator 58 may also forward frames to control unit 37 when a threshold number of frames have been received. For example, frame aggregator 58 may monitor counters 56 associated with queues 52. Upon adding a frame to one of queues 52 and incrementing the corresponding one of counters 56, frame aggregator 58 may determine whether the counter has reached a threshold value. When one of counters 56 reaches the threshold value, frame IFC 48 may read the frames from the corresponding one of queues 52, and selectively retrieve a unique identifier from VC data 51 for the frames of the associated queue based on the virtual circuits 50. Frame IFC 48 communicates the frames and the respective unique identifiers to control unit 37. Frame aggregator 58 may reset the counter upon communicating the frames to control unit 37.

Figure 6:
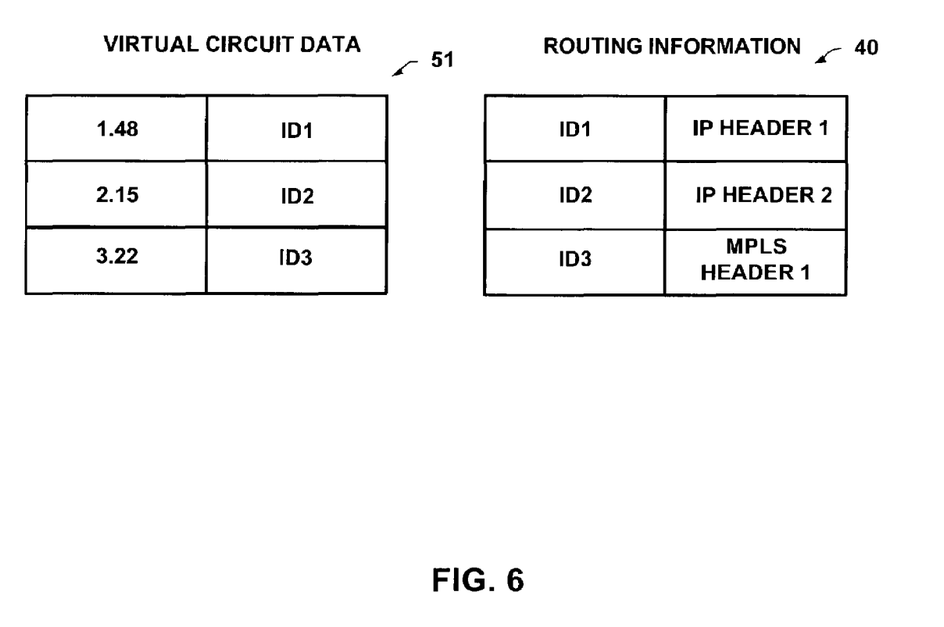
FIG. 6 is a block diagram illustrating example data structures maintained by a router to map virtual circuits to associated headers.

FIG. 6 is a block diagram illustrating example data structures maintained by routers 18 of FIG. 4 to map virtual circuits 50 to associated headers for forming packets. In the example of FIG. 6, VC data 51 is arranged as a table that maps virtual circuits 50 to unique identifiers. VC data 51 may map, for example, a first virtual circuit 1.48 to an identifier ID1, a second virtual circuit 2.15 to an identifier ID2, and a third virtual circuit 3.22 to an identifier ID3.

Routing information 40 is arranged as a table that maps the unique identifiers to associated headers. Routing information 40 may map, for example, ID1 to IP HEADER 1, ID2 to IP HEADER 2, and ID3 to MPLS HEADER 1. Routing information 40 may further map MPLS headers to corresponding LSPs.

The data structure in FIG. 6 are illustrated for exemplary purposes only, and may be arranged in any number of forms, and may store a wide variety of additional data. For example, routing information 40 and VD data 51 may be arranged as radix trees, link lists, and other data structures. Routing information 40 may include addition routing entries to reflect the topology of the IP network, as well as next hop data describing neighboring devices of routers 18 along routes within the IP network. Routers 18 may store the data structures for access by control unit 37 within a variety of types of computer-readable media, such as non-volatile random access memory (NVRAM), read-only memory (ROM), dynamic random access memory (DRAM), FLASH memory, magnetic media, optical media, and the like.

Upon aggregating a threshold number of frames in one of queues 52 or a timing mechanism indicating that queues 52 has buffered the frames for more than a threshold time interval, frame IFC 48 may read the frames of the respective queues 52, and selectively retrieves a unique identifier from VD data 51 for the frames of associated queues 52 based on the virtual circuits 50 that correspond to queues 52. For example, upon aggregating a threshold number of frames in queues 52 corresponding to virtual circuit 2.15, frame IFC 48 may retrieve unique identifier ID2 from VC data 51. Frame IFC 48 communicates the set of frames and the respective unique identifier to control unit 37.

Control unit 37 assigns each inbound set of frames an appropriate header from routing information 40 based on the respective unique identifier, and forms outbound packets by pre-pending the header to the respective set of frames. For example, upon receiving the set of frames from queue 52 corresponding to virtual circuit 2.15 and the unique identifier, control unit 37 assigns the set of frames IP HEADER 2. Control unit 37 forms an outbound packet by pre-pending IP HEADER 2 to the set of frames. In accordance with routing information 40, control unit 37 forwards the packet on IP network 14 via network link 46.

Figure 7:
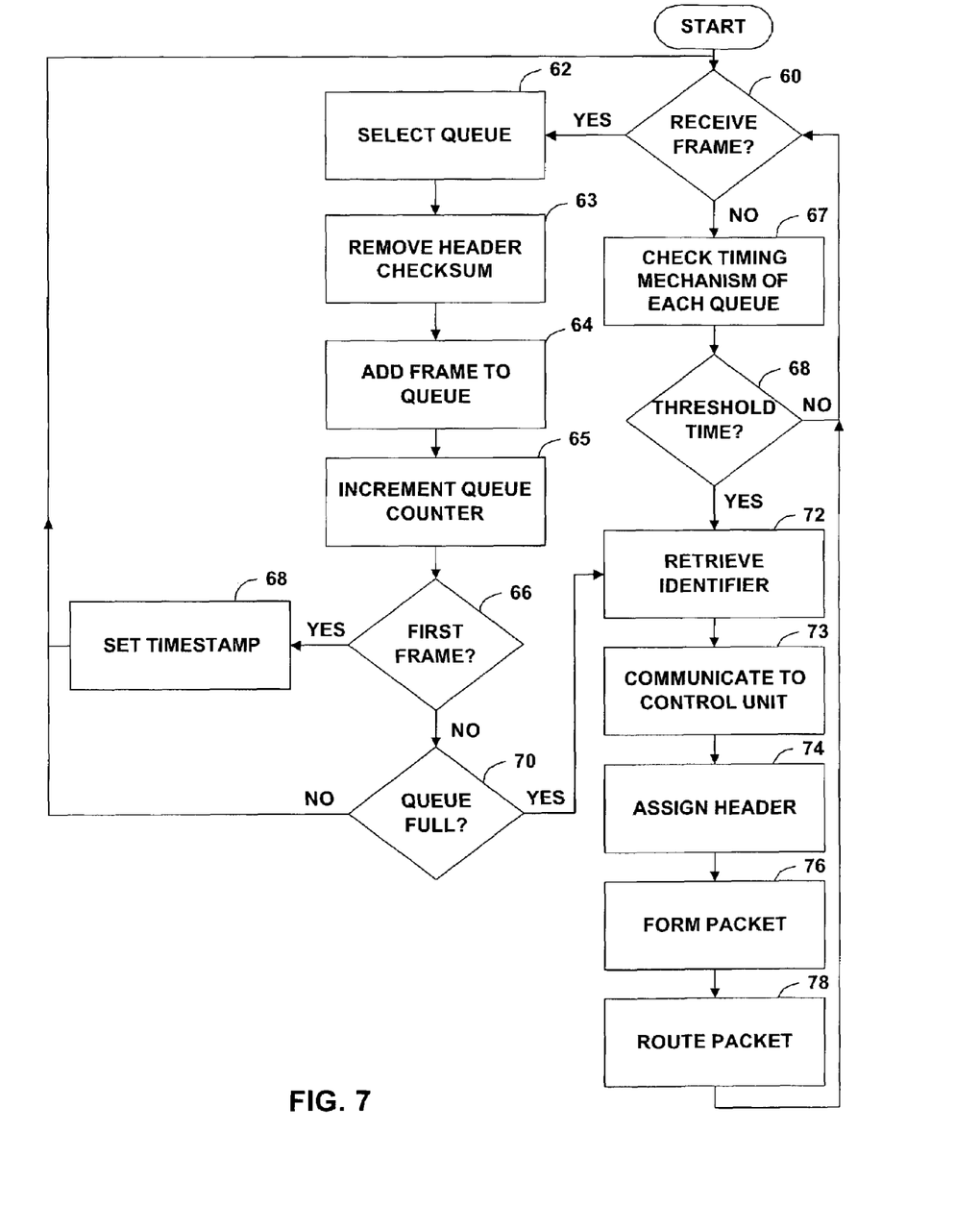
FIG. 7 is a flowchart illustrating an example mode of operation of an ingress router when receiving frames from an ATM network.

FIG. 7 is a flowchart illustrating an example mode of operation of ingress router 18A of FIG. 1 when receiving frames from customer network 12A. When frame IFC 48 receives an inbound frame from ATM network 12A via one of virtual circuits 50, frame aggregator 58 may select the appropriate one of queues 52 based on virtual circuit 50 from which the inbound frame was received (60, 62). Upon adding a frame to queues 52, frame aggregator 58 may remove the header checksum of the frames (63). Frame aggregator 58 adds the frame to the corresponding one of queues 52 (64). As mentioned previously, queues 52 may buffer inbound frames from a single one of virtual circuits 50, or more than one of virtual circuits 50. The destination of incoming frames buffered in one of queues 52 that corresponds to multiple virtual circuits 50 may need to be the same one of routers 18 in order to correctly relay the frames through IP network 14.

Frame aggregator 58 may increment the one of counters 56 associated with the one of queues 52 receiving the frame, and determine whether the frame is the first frame added to that one of queues 52 (65, 66). When the frame is the first frame added to queue 52, frame aggregator 58 sets the one of timestamps 54 associated with queues 52 (68). As mentioned, timestamps 54 may record the time at which the first frame arrives in respective queues 52. Alternatively, timestamps 54 may record the time of arrival of the last frame in respective queues 52.

When the frame is not the first frame added to one of queues 52, frame aggregator 58 determines whether that one of queues 52 is full (70). One of queues 52 may be full when the number of frames in the queue is equal to a threshold number of frames, which may be specified by an administrator upon configuration. For example, an administrator may configure frame IFC 48 to buffer a maximum of eight frames in queues 52. In that case, upon adding the eighth frame to one of queues 52, frame aggregator 58 determines the queue is full. When one of queues 52 is full, frame aggregator 58 retrieves an identifier based on virtual circuits 50 from which the frames of queues 52 arrived (72). Alternatively, the identifiers may be associated with queues 52 that aggregate the frames. Frame IFC 48 communicates the set of frames and the associated unique identifier to control unit 37 (73).

Control unit 37 assigns each inbound set of frames an appropriate header from routing information 40 based on the respective unique identifier (74), and forms outbound packets by pre-pending the header to the respective set of frames (76). For example, upon receiving the set of frames from a corresponding one of queues 52 and the associated unique identifier, control unit 37 may consult routing information 40 to determine the mapping of the unique identifier to a header. Control unit 37 may form the packet by pre-pending the header to the set of frames. Control unit 37 forwards the packet on IP network 14 via network link 46 in accordance with routing information 40 (78). In other embodiments, control unit 37 may be responsible for aggregating the frames, and creating packets that encapsulate the frames. Furthermore, the functions of frame aggregator 58 may be shared among multiple processes. For example, one process may be responsible for receiving the frames, selecting one of queues 52 that corresponds to one of virtual circuits 50 that received the frame, and adding the frames to the queue. Another process may be responsible for selecting a unique identifier for the frames and communicating the frames and unique identifier to control unit 37. When one of queues 52 is not full, ingress router 18A waits to receive another frame from customer network 12A.

When frame IFC 48 does not receive an inbound frame from ATM network 12A via one of virtual circuits 50, frame aggregator 58 checks the timing mechanisms of each of queues 52 to determine whether or not any of the frames have been buffered for more than a threshold time interval (67, 68). For example, frame aggregator 58 may compare each of timestamps 54 to a real-time clock to determine whether the difference between each of timestamps 54 and the current time exceeds the threshold time interval. When the difference between timestamps 54 of any queues 52 and the current time exceed the threshold time interval, which may be specified by an administrator upon configuration, frame aggregator 58 retrieves an identifier based on the virtual circuits 50 from which the frames of queues 52 arrived (72). Frame IFC 48 communicates the set of frames and the associated unique identifier to control unit 37 (73).

Control unit 37 assigns each inbound set of frames an appropriate header from routing information 40 based on the respective unique identifier (74), and forms outbound packets by pre-pending the header to the respective set of frames (76). Control unit 37 forwards the packet on IP network 14 via network link 46 in accordance with routing information 40 (78). When timestamps 54 of corresponding queues 52 does not exceed the threshold time interval, frame aggregator 58 determines whether ingress router 18A receives a frame from a customer network 12A.

Figure 8:
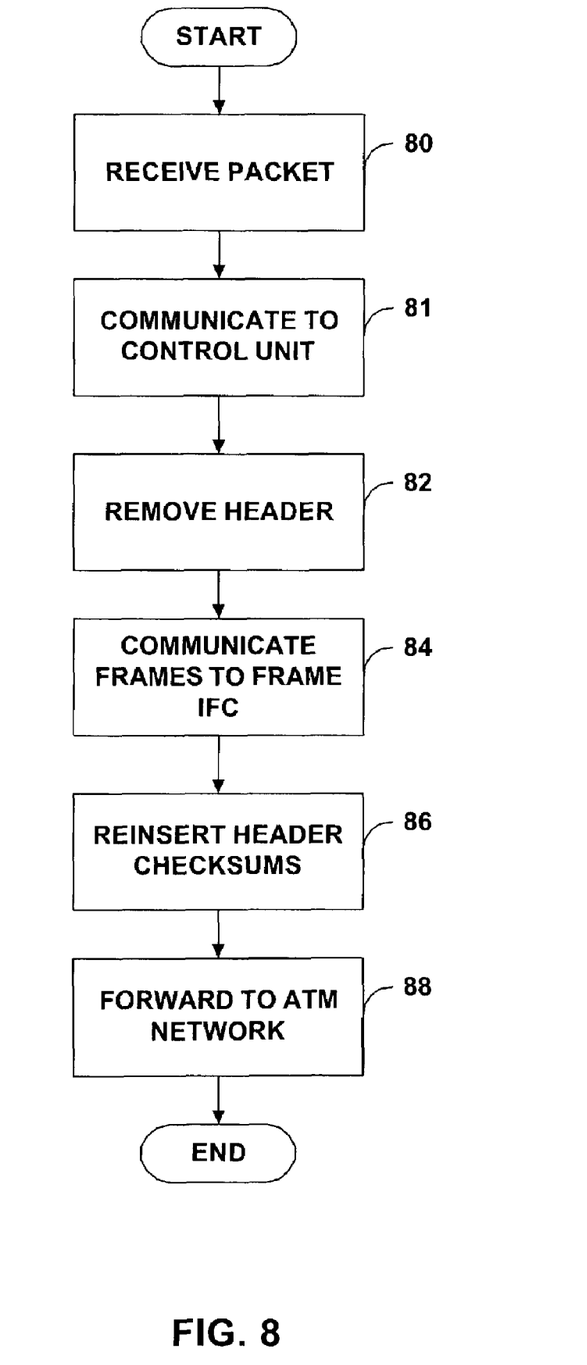
FIG. 8 is a flowchart illustrating an example mode of operation of egress router when receiving packets that encapsulate frames from an IP network.

FIG. 8 is a flowchart illustrating an example mode of operation of egress router 18B of FIG. 1 when receiving packets that encapsulate frames from IP network 14. IP IFC 42 receives a packet from IP network 14 via network link 44 (80). IP IFC 42 communicates the packet to control unit 37 (81). Control unit 37 removes the header from the packet (82), and communicates the encapsulated frames of the packet to frame IFC 48 (84). Frame IFC 48 reinserts the header checksum into the frames (86), and forwards the frames to ATM network 12B via virtual circuits 50 (88).

A number of embodiments of the present invention have been described. Nevertheless, it will be understood that various modifications may be made without departing from the spirit and scope of the invention. Accordingly, other embodiments are within the scope of the following claims.

The invention claimed is:

1. A method comprising:
   buffering a set of one or more frames within a data structure;

forming an Internet Protocol (IP) packet to encapsulate the set of frames when at least one of the set of frames is buffered within the data structure for a threshold time interval prior to a size of the data structure reaching a threshold size;

forming the IP packet to encapsulate the set of frames when the size of the data structure reaches the threshold size prior to any of the set of frames being buffered within the data structure for the threshold time interval; and forwarding the IP packet to an IP network.

2. The method of claim 1, further comprising initiating a timing mechanism upon receiving a first frame.

3. The method of claim 2, wherein initiating a timing mechanism comprises setting a timestamp associated with the first frame.

4. The method of claim 3, further comprising:
reading a current time;
comparing the timestamp with the current time; and
forming the packet when the current time exceeds the timestamp by at least a threshold time interval.

5. The method of claim 2 wherein initiating a timing mechanism comprises starting a timer.

6. The method of claim 5, wherein starting a timer comprises starting a software timer.

7. The method of claim 5 wherein starting a timer comprises starting a hardware timer.

8. The method of claim 1, further comprising associating a set of data structures with virtual circuits to aggregate the frames.

9. The method of claim 8, further comprising:
receiving a frame from one or more virtual circuits;
selecting one of a plurality of associated data structures based on the virtual circuit from which the frame was received; and
adding the frame to the selected data structure.

10. The method of claim 8, wherein associating a set of data structures with virtual circuits includes associating a data structure with each virtual circuit.

11. The method of claim 8, wherein associating a set of data structures with virtual circuits includes associating at least one data structure with more than one of the virtual circuits.

12. The method of claim 8, further comprising implementing the data structures as queues.

13. The method of claim 1, wherein forming a packet includes pre-pending a header to the set of frames based on virtual circuits from which the frames were received.

14. The method of claim 1, further comprising:
reading the buffered frames; and
retrieving a unique identifier from a data structure that maps unique identifiers to virtual circuits that received the frames.

15. The method of claim 14, further comprising:
assigning a header to frames that correspond to the unique identifier; and
wherein forming a packet includes pre-pending the header to the buffered frames.

16. The method of claim 15, wherein the header comprises one of a label-switched path header and a packet protocol header.

17. The method of claim 1, wherein buffering a set of one or more frames includes buffering a set of one or more variable length frames.

18. The method of claim 1, wherein buffering a set of one or more frames includes buffering a set of one or more fixed length frames.

19. The method of claim 1, wherein the frames include one or more cells of a fixed length.

20. The method of claim 1, wherein the frames comprise one of asynchronous transfer mode (ATM) frames and frame relay frames.

21. The method of claim 1, wherein forming a packet to encapsulate the set of frames includes forming a packet to encapsulate the set of frames in the order the frames were received.

22. The method of claim 1, wherein forming the IP packet to encapsulate the set of frames when the size of the data structure reaches the threshold size comprises forming the IP packet upon buffering a threshold number of frames prior to any of the set of frames being buffered within the data structure for the threshold time interval.

23. The method of claim 1, wherein the forming the IP packet when the size of the data structure reaches the threshold size comprises forming the IP packet to encapsulate the set of frames upon buffering a threshold number of frames bytes prior to any of the set of frames being buffered within the data structure for the threshold time interval.

24. A computer-readable medium comprising instructions that cause a programmable processor to:
buffer a set of one or more frames within a data structure;
form an Internet Protocol (IP) packet encapsulate the set of frames when at least one of the set of frames is buffered within the data structure for a threshold time interval prior to a size of the data structure reaching a threshold size;
forming the IP packet to encapsulate the set of frames when the size of the data structure reaches the threshold size prior to any of the set of frames being buffered within the data structure for the threshold time interval; and
forward the IP packet to an IP network.

25. The computer-readable medium of claim 24, further comprising instructions that cause the processor to initiate a timing mechanism upon receiving a first frame.

26. The computer-readable medium of claim 24, wherein instructions to buffer a frame include instructions that cause the processor to:
receive a frame from one or more virtual circuits;
select one of a plurality of data structures based on the virtual circuit that received the frame; and
add the frame to the selected data structure.

27. The computer-readable medium of claim 26, wherein instructions to form a packet include instructions that cause the processor to pre-pend a header to the frames based on virtual circuits that received the frames.

28. The computer-readable medium of claim 26, further comprising instructions that cause the processor to:
read the buffered frames;
retrieve a unique identifier from a data structure that maps unique identifiers to virtual circuits that received the frames; and
assign a header to frames that correspond to the unique identifier.

29. An apparatus comprising:
an interface card to receive a set of one or more frames;
a data structure to buffer the received set of frames; and
a control unit to form an Internet Protocol (IP) packet to encapsulate the set of buffered frames when at least one of the set of frames is buffered within the data structure for a threshold time interval prior to a size of the data structure reaching a threshold size, form the IP packet to encapsulate the set of frames when the size of the data structure reaches the threshold size prior to any of the set of frames being buffered within the data structure for the threshold time interval, and to forward the IP packet to an IP network.

30. The apparatus of claim 29, wherein the data structure comprises a first data structure and wherein the apparatus further comprises:

at least one other data structure to store the inbound frames;

a timing mechanism associated with each data structure to track an amount of time that has elapsed since a first frame was added to the corresponding data structure; and     a counter associated with each data structure to track a number of frames in each data structure.

31. The apparatus of claim 29, wherein the interface card receives the frames from one or more virtual circuits.

32. The apparatus of claim 31, further comprising a data structure that maps headers to corresponding virtual circuits.

33. The apparatus of claim 29, further comprising a frame aggregator to receive the frames from the virtual circuits and to buffer the frames.

34. The apparatus of claim 29, further comprising a second interface card for coupling to an IP network, wherein the second interface card outputs the packet to the IP network.

35. The apparatus of claim 29, wherein the control unit further removes headers from inbound packets from the IP network to form outbound frames, and communicates the packets to the interface card.

36. The apparatus of claim 29, further comprising:

a counter associated with the data structure to track the size of the data structure.

37. A method comprising:

receiving a set of one or more ATM frames from one or more ATM virtual circuits;

buffering the ATM frames within a data structure;

forming an Internet Protocol (IP) packet to encapsulate the ATM frames when at least one of the ATM frames is buffered within the data structure for a threshold time interval prior to a size of the data structure reaching a threshold size;

forming the IP packet to encapsulate the set of frames when the size of the data structure reaches the threshold size prior to any of the set of frames being buffered within the data structure for the threshold time interval; and forward in the IP packet to an IP network.

\* \* \* \* \*

UNITED STATES PATENT AND TRADEMARK OFFICE
CERTIFICATE OF CORRECTION

| | | |
|---|---|---|
| PATENT NO. | : 7,420,988 B1 | Page 1 of 1 |
| APPLICATION NO. | : 10/369054 | |
| DATED | : September 2, 2008 | |
| INVENTOR(S) | : Grossman | |

It is certified that error appears in the above-identified patent and that said Letters Patent is hereby corrected as shown below:

Column 12, line 23, "form an Internet Protocol (IP) packet encapsulate the set of" should read -- form an Internet Protocol (IP) packet to encapsulate the set of --

Column 14, line 21, "forward in the IP packet to an IP network." should read -- forwarding the IP packet to an IP network. --

Signed and Sealed this

Twenty-fourth Day of August, 2010

David J. Kappos
*Director of the United States Patent and Trademark Office*